Sept. 30, 1941.    P. DE LEEUW ET AL    2,257,371
BONDED ABRASIVE ARTICLE
Filed Nov. 10, 1939
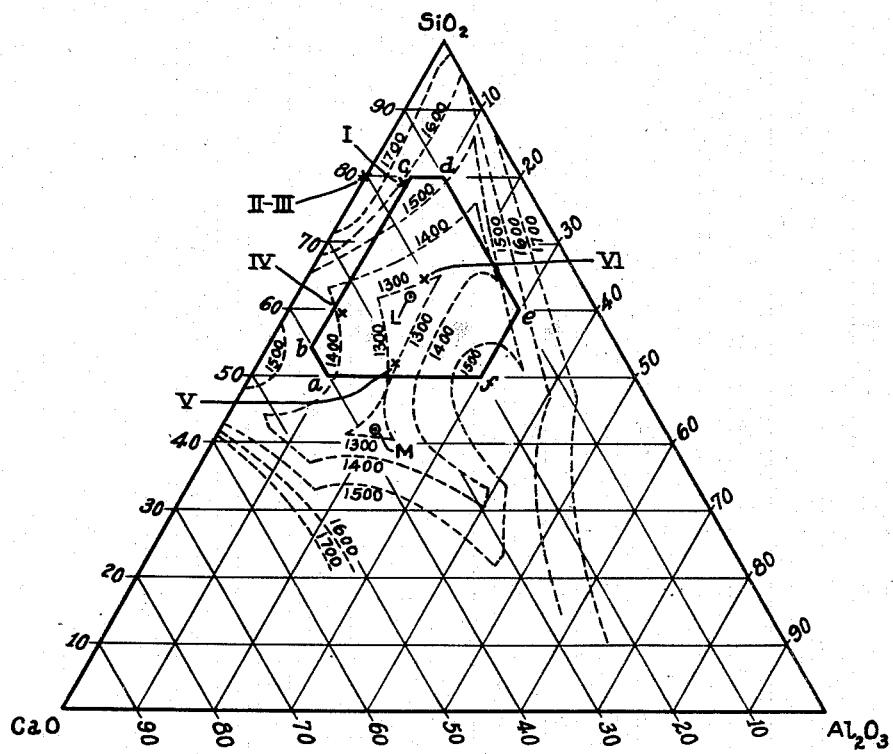
DASHES INDICATE ISOTHERMS.
L, M - INDICATE TWO OF THE EUTECTIC POINTS.
INVENTORS.
PETER DE LEEUW
CHARLES E. WOODDELL
BY
ATTORNEY.

Patented Sept. 30, 1941

2,257,371

UNITED STATES PATENT OFFICE 2,257,371

BONDED ABRASIVE ARTICLE

Peter de Leeuw and Charles E. Wooddell, Niagara Falls, N. Y., assignors to The Carborundum Company, Niagara Falls, N. Y., a corporation of Delaware Application November 10, 1939, Serial No. 303,830

6 Claims. (Cl. 51—307)

This invention relates to a vitrified bond for abrasive articles which have a strong resistance to the solvent and leaching action of hot water. Such a bond is useful, for example, for the making of abrasive segments to be used in the construction of pulp wheels, that is, abrasive wheels for the grinding of wood pulp. These wheels are operated in contact with hot water whose temperature usually is above 140° F. and sometimes approaches that of boiling water.

Heretofore the hot water resistance of the exposed parts of pulp wheels has been only fairly satisfactory. On continued immersion in boiling water a vitrified clay bond, which has been considered one of the best, showed a loss in tensile strength of 32 per cent after 200 days. As pulp wheels are designed to operate more or less continuously for several years it is evident that this weakening of the bond in the presence of hot water is an undesirable feature.

There are many ceramic compounds that are known to be only slightly soluble in hot water. However, when some of these compounds are used for the bonding of abrasive grain, such as fused alumina, the bonded article does not retain the water resistance of the bond itself. For example, "Pyrex" glass is only very slightly affected by the solvent action of hot water. If, however, this glass is used as a bond for particles of fused alumina, the articles thus produced disintegrate in boiling water. This effect is probably connected with the absorption of alumina from the abrasive particles during the vitrification process.

An abrasive article containing aluminous abrasive grain and a binder comprising the hydrothermal reaction products of CaO, SiO$_2$ and Al$_2$O$_3$ is described in U. S. Patent No. 2,138,829 to R. C. Benner and P. de Leeuw. The abrasive article there described was found in general to become stronger when subjected to boiling water. The hydrothermal bonding just referred to was carried out in autoclaves in which the saturated steam pressures ranged from 120 pounds per square inch to 210 pounds per square inch. The corresponding temperature limits as given by steam tables are approximately 177° C. to 200° C. These bonding temperatures are very low as compared with the temperatures used in bonding the abrasive articles described in the present application, namely at or above 1300° C. The abrasive articles described in the U. S. Patent No. 2,138,829 are therefore hydrothermally bonded abrasive articles which are bonded at temperatures far below a red heat, while the abrasive articles made according to the present invention are bonded at approximately a white heat during the process of manufacture.

The following examples will serve to illustrate the practice of the invention.

I. A mix was made up by weight of:

| | Parts |
|---|---|
| Hydrated lime | 240 |
| Silica, such as ground flint | 900 |
| Levigated alumina | 60 |
| Fused alumina particles | 2800 |

The fused alumina used in this experiment consisted of material obtained by fusing ordinary bauxite and contained about 4 per cent impurities such as iron and titanium oxides. One third of the grain was approximately 50 mesh (referring to screens of 50 meshes to the linear inch), one half 60 mesh, and one sixth 80 mesh. Sufficient water was used to obtain a satisfactory consistency for molding. Figure eight briquettes were pressed at 2500 pounds per square inch, and then dried and subsequently fired in a tunnel kiln at temperatures which were approximately 1300° C. The tensile strength was determined in the case of some of the similarly made briquettes, and the rest were immersed completely and continuously in a boiling water bath with constant overflow. At intervals of 30, 90, 180 and 240 days some of the briquettes were removed from the hot water bath, dried and their tensile strength determined. The following results were obtained:

The average tensile strength of the briquettes which were not subjected to hot water was 2010 lbs./sq. in. This value may be called the original dry tensile strength.

Tensile strengths for the briquettes subjected to boiling water were in the order of the duration of the immersion:

| Time immersed (in days) | Tensile strength in pounds per square inch |
|---|---|
| 30 | 2,150 |
| 90 | 2,230 |
| 180 | 2,300 |
| 240 | 2,410 |

These results indicate a gain of 19.8 per cent in tensile strength for an immersion in boiling water during 240 days.

II. In a second example the mix was composed of:

| | Parts |
|---|---|
| Hydrated lime | 300 |
| Ground flint | 900 |
| Fused alumina particles | 2800 |

In this case the fused alumina particles were composed of the same grit sizes as in Example I, but the aluminous grain was made from a purer material than ordinary bauxite and was composed of more than 99 per cent alumina.

The making and testing of the briquettes was carried out in the same manner as that described for Example I. The original dry tensile strength was 1900 pounds per square inch. The tensile strengths obtained after 30 days immersion in boiling water and after 90 days immersion in boiling water were respectively 1850 and 1860 pounds per square inch, representing a loss in tensile strength of only about 2.4 per cent.

III. A mix was prepared containing the following ingredients:

| | Parts |
|---|---|
| Hydrated lime | 300 |
| Ground flint | 900 |
| Fused alumina particles | 2800 |

The type of fused alumina grain was the same as in Example I, that is, it was made from ordinary bauxite. However, the combination of particle sizes was different and varied between 30 and 220 mesh material. The relative masses of the different sizes were as follows:

| Grit size (meshes to the linear inch) | Corresponding percentages |
|---|---|
| 30 | 5 |
| 36 | 10 |
| 40 | 15 |
| 60 | 15 |
| 80 | 15 |
| 100 | 15 |
| 120 | 5 |
| 150 | 5 |
| 220 | 15 |

The making and testing of the test pieces was the same as in the case of the previous examples. The original dry tensile strength was 2170 pounds per square inch. The tensile strength obtained after 30 days immersion in boiling water was 2400 pounds per square inch. This indicated a gain of 10.6 per cent as a result of the immersion in hot water.

In contrast to the water resistance shown by the results of the tests described in Examples I, II and III, a vitrified clay bond, which had been considered a good bond for abrasive articles, showed a tensile strength of 2890 pounds per square inch before hot water treatment and a tensile strength of 1900 pounds per square inch after 200 days immersion, indicating a loss of 34 per cent.

The type of bond which has been described at length above and which is used in the present invention has another characteristic which simplifies the manufacture of abrasive segments and the like. The hydrated lime in the initial bond provides sufficient plasticity, and hardens enough on drying so that no temporary binder is necessary. The bond itself is substantially free from organic substances such as are present in clays and consequently there is not the difficulty in burning out carbonized residues that occurs in the case of the usual ceramic bonds.

The type of mix that has been described above in connection with Examples I, II and III can be prehardened by means of steam treatment under pressure. This step facilitates the making of large abrasive wheels. According to the usual practice in making vitrified wheels with clay bonds, a temporary binder is included in the mix so that the molded article will hold its shape during the drying process that follows molding and during the transfer to the kiln and later during the firing operation. The temporary binder used with the clay bonds provides a certain amount of strength. Nevertheless, the wheel must be handled with great care in order to prevent the formation of chips or cracks.

With the bonds which form the subject of this invention the molded article is dried in the usual manner, and then, without removal from the plate on which it rests, is given additional strength by a hydrothermal treatment. The tensile strength thus obtained is of the order of magnitude of 1000 pounds per square inch, and the prehardened article can be removed from the plate and placed in the kiln with little danger of damage. An example of this procedure is as follows:

IV. The mix for the manufacture of the abrasive article contained:

| | Parts |
|---|---|
| Hydrated lime | 480 |
| Silica in the form of ground flint | 640 |
| Levigated alumina | 80 |
| Fused alumina particles | 2800 |

The abrasive grain in this case was of the same type as in the case of Example I and had a similar distribution of grit sizes. After forming the briquettes at a pressure of 2500 pounds per square inch they were covered with sand and allowed to stand for a few days. They were then indurated by means of a steam treatment at 150 pounds gauge pressure for 16 hours. The measurements of tensile strength on some of the bricks indicated a resultant tensile strength of 1014 pounds per square inch produced by the hydrothermal treatment. After firing the remaining briquettes in a tunnel kiln measurements on some of the briquettes indicated an increase in tensile strength to 1705 pounds per square inch as a result of the firing in the kiln. The remaining briquettes were then immersed in boiling water for 205 days. Measurements of tensile strength on these last briquettes showed a dry tensile strength of 1810 pounds per square inch, indicating an increase of 6.2 per cent. This result indicates that the tensile strength of the vitrified product was not impaired by the prehardening effected by the hydrothermal treatment, but on the other hand was actually increased.

Some additional examples of lime-silica-alumina bonding mixtures are given below.

V. 10.5 parts of hydrated lime, 15.0 parts of silica and 4.5 parts of finely divided alumina were mixed with about 70 parts of fused alumina granules. Briquettes were made and fired in a tunnel kiln using the general procedure described above. The tensile strength of the briquettes which were tested after firing and without immersion in water was 1810 pounds per square inch. Measurements on the briquettes which were immersed in boiling water for 240 days showed a tensile strength of 1610 pounds per square inch, indicating a loss of 11 per cent.

VI. 7.5 parts of hydrated lime were mixed with 18 parts of silica, 4.5 parts of finely divided alumina and 70 parts of fused alumina grain. The original tensile strength of the fired briquettes was 1860 pounds per square inch. After immersion in boiling water for 240 days the measurements indicated a tensile strength of 2000 pounds per square inch, thus showing a gain in tensile strength due to the immersion in boiling water of 7.5 per cent.

The triangular diagram shown in the drawing gives the location of points corresponding to the bond mixtures used in making up the Examples I to VI, inclusive. These points are indicated by means of crosses. Some isotherms indicate temperatures (known or inferred) from a Sosman-Anderson triaxial diagram for the system $SiO_2$—$CaO$—$Al_2O_3$. The points I—VI are plotted from the percentages of CaO, $SiO_2$, and $Al_2O_3$ in the applicants' original bonding mixtures. There are reasons for believing, however, that some $Al_2O_3$ is absorbed from the alumina grain whose mass is equal to several times that of the bonding mixtures. In the case of Examples II and III the softening point of the $CaO$—$SiO_2$ bond would be, in the absence of alumina, about 1700° C., while the kiln temperature did not exceed about 1300° C. Since high tensile strengths were obtained in Examples II and III it appears that there must have been softening enough at and near the surfaces of the alumina grain to form a strong article on cooling. If a straight line be drawn on the triangular diagram connecting the point II with the point VI, it will be noted that the softening temperatures rapidly decrease with increase in percentage of alumina. The point VI lies near a point L on the diagram which is a eutectic point having a corresponding temperature of 1165° C. The point V also is comparatively near L. The area in the diagram for which the best water resistance was obtained is bounded approximately by 50–80% $SiO_2$, 10–40% CaO and 6–30% $Al_2O_3$. This is approximately the six-sided area *abcdefa* shown in the drawing. Here again the percentages of $SiO_2$, CaO and $Al_2O_3$ are those which occurred in the original bonding mixtures. It is believed that these percentages are greatly modified at and near the surfaces of the abrasive grain. The points II and III lie somewhat outside the area *abcdefa*, but represent bonds which give good dry tensile strength and which have also good water resistance.

Changes may be made in the mechanical and thermal treatments of the ingredients of the bonding mixture without departing from the invention which is defined within the compass of the following claims:

We claim:

1. A bonded abrasive article comprising aluminous abrasive and a vitrified binder which is substantially free from the oxides of alkaline metals and made from a mixture of alumina, lime and silica whose components fell within the limits 0–20 per cent $Al_2O_3$, 15–50 per cent CaO and 40–85 per cent $SiO_2$ before heating in contact with the abrasive grain.

2. A bonded abrasive article that is strongly resistant to the action of hot water, said article comprising aluminous abrasive grain and a vitrified binder which is substantially free from the oxides of alkaline metals and made from a mixture of finely divided oxides whose components prior to vitrification fell within the percentage limits 50–80 per cent $SiO_2$, 10–40 per cent CaO and 6–30 per cent $Al_2O_3$.

3. The method of making abrasive articles which comprises mixing hydrated lime, finely divided silica and finely divided alumina with a larger mass of fused alumina granules, pressing the mix in a mold, prehardening the molded article by treatment with steam, and increasing the tensile strength of the prebonded abrasive article by curing it at temperatures above 1200° C.

4. The method of making abrasive articles which comprises mixing hydrated lime, finely divided silica and finely divided alumina with a larger mass of fused alumina granules, pressing the mix in a mold, prehardening the molded article, and curing it at temperatures above 1200° C.

5. A vitrified bond for abrasive grain whose components prior to reaction with the grain fell within the limits 0–20 per cent $Al_2O_3$, 15–50 per cent CaO and 45–85 per cent $SiO_2$ with substantially no oxides of alkali metals.

6. A vitrified bond for abrasive grain that is strongly resistant to the action of hot water, said bond having prior to reaction with the grain components that fell within the limits 6–30 per cent $Al_2O_3$, 10–40 per cent CaO and 50–80 per cent $SiO_2$ with substantially no oxides of alkali metals.

PETER DE LEEUW.
CHARLES E. WOODDELL.